(12) United States Patent
Coglianese et al.

(10) Patent No.: US 8,271,366 B2
(45) Date of Patent: Sep. 18, 2012

(54) SYSTEM AND METHOD FOR PROVIDING HIGH PERFORMANCE COMPLIANCE SERVICES USING PRE-CALCULATED RULE EVALUATION

(75) Inventors: Michael L. Coglianese, Boston, MA (US); Hui Yang, Boston, MA (US); David M. Curley, Boston, MA (US)

(73) Assignee: ITG Software Solutions, Inc., Culver City, CA (US)

( * ) Notice: Subject to any disclaimer, the term of this patent is extended or adjusted under 35 U.S.C. 154(b) by 536 days.

(21) Appl. No.: 12/466,961

(22) Filed: May 15, 2009

(65) Prior Publication Data

US 2010/0293015 A1 Nov. 18, 2010

(51) Int. Cl.
*G06Q 40/00* (2012.01)
(52) U.S. Cl. ............ 705/35; 705/36 R; 705/37
(58) Field of Classification Search ............ 705/35, 705/36 R, 37
See application file for complete search history.

(56) References Cited

U.S. PATENT DOCUMENTS

| | | | | |
|---|---|---|---|---|
| 5,893,079 A * | 4/1999 | Cwenar | .......... | 705/36 R |
| 6,820,069 B1 * | 11/2004 | Kogan et al. | .......... | 706/46 |
| 2002/0059107 A1 * | 5/2002 | Reich et al. | .......... | 705/26 |
| 2005/0038726 A1 * | 2/2005 | Salomon et al. | .......... | 705/36 |

OTHER PUBLICATIONS

Carol McGinn. (Jan. 1999). Compliance rises to top of buy side tech list. Wall Street & Technology: Product Digest,16-20. Retrieved May 11, 2012.*

* cited by examiner

*Primary Examiner* — Kito R Robinson
(74) *Attorney, Agent, or Firm* — Rothwell, Figg, Ernst & Manbeck, P.C.

(57) ABSTRACT

The present invention relates to a compliance system that allows users to verify that trading rules and regulations are being followed throughout the intraday trading activity. In particular, the systems and methods of the present invention allow a user to verify compliance with trading rules locally at a trading terminal.

39 Claims, 6 Drawing Sheets

SYSTEM AND METHOD FOR PROVIDING HIGH PERFORMANCE COMPLIANCE SERVICES USING PRE-CALCULATED RULE EVALUATION

BACKGROUND OF THE INVENTION

1. Field of the Invention

The present invention relates to methods and systems for efficiently performing compliance evaluations of asset trades and, in particular, systems and methods that utilize a novel configuration and methodology to improve performance and reduce cost.

2. Description of the Related Art

Asset trading institutions such as investment banks and hedge funds frequently manage many accounts or portfolios on a day to day basis. While portfolio management can include a number of different functions, the most important of these relate to rebalancing the make-up of holdings in the portfolio by trading assets, such as securities, in order to maximize the value of the portfolio. The holdings in a portfolio are changed according to, among other things, objectives set by the trading institution and/or customers. Additionally, the Securities and Exchange Commission (SEC) and other governmental bodies set forth regulations concerning what kinds of assets and the amounts of certain assets that various entities can trade or hold. Institutions will, accordingly, establish a number of trading rules associated with its firm, each portfolio, or account that limit the way in which assets may be traded in accordance with the objectives and regulations relevant to that account.

Trading rules can typically be divided into two kinds of rules: calculated rules and restriction rules. Calculated rules can relate, for example, to the size of an account's position of a particular asset. For instance, a firm or trader may assign a rule to an account that requires that its holdings consist of 5% to 10% technology stocks. Thus, to enforce this rule, a calculation must be made for proposed trades to see if the resulting rebalancing will result in a portfolio that consists of 5% to 10% technology stocks.

Unlike calculated rules, restriction rules do not relate to the size of an account's position of a particular asset, but, rather, to whether an account trade can be placed at all. For example, a restriction rule might prohibit a given account from buying or holding foreign securities. An account may have multiple calculated and restriction rules associated with it.

While some trading rules are merely indicative of a certain trading strategy and can be bent from time to time, other trading rules (e.g., the ones stemming from governmental regulations) must be adhered to at all times. For instance, an account holder might be legally prohibited from ever owning certain kinds of assets (e.g., foreign securities) and subject to stiff fines or legal sanctions if they ever do own the prohibited assets. Accordingly, institutions should evaluate a proposed trade order for compliance with the trading rules prior to their execution of the order.

Given the complexity of the various trading rules and the cost of latency when making trades (executing trade orders), computerized compliance systems have been made to perform the compliance evaluations or checks. Such compliance systems may be integrated with order management system (OMS) or execution management system (EMS) products and can receive proposed trades and return an indication whether the trade complies with a set of rules.

When a trader decides to make a trade, the trader enters the pertinent information about the trade into a trading terminal and submits the trade to, for instance, an OMS. Prior to executing the trade, the trade information is submitted to a compliance system in order to evaluate the pending trade's compliance with the pertinent trading rules. The compliance system typically queries a data storage facility such as a database to obtain the rule information required for it to determine whether the trade complies with the trading rules, makes a compliance determination, and sends a response indicating compliance or non-compliance back to the OMS. Even with high performance computers and network connections, the prior art compliance process takes time—an amount of time that can be entirely unacceptable in a fast moving market.

The time required to check the compliance of a potential trade with trading rules could be reduced significantly if compliance could be evaluated locally at the trading desktop terminal rather than by the compliance system. However, presently it is prohibitively costly in terms of hardware and system resources to provide all of the information required to perform compliance checking locally.

Thus, there exists a need in the art for new and improved systems and methods capable of evaluating compliance with trading rules at higher speeds and lower cost.

SUMMARY OF THE INVENTION

According to some embodiments of the present invention, a system for trading account assets over an electronic computer network is provided. The system includes a user computer terminal, a compliance module, a compliance services server, and data storage facilities. The user computer terminal may have a user interface configured to receive input information relating to a proposed order to trade an asset associated with a particular account. The account may have a plurality of trading rules associated with it.

The compliance services server may be electronically coupled with the user computer terminal via an electronic data network and configured to receive a message requesting a compliance check for a proposed trade order from the user computer terminal. The compliance check is used to determine whether the proposed trade order complies with the plurality of trading rules using a set of computer-executable trading rules. The compliance services server may be further configured to generate a message indicating whether the proposed trade order complies with the plurality of trading orders and to transmit that message to the use computer terminal.

The compliance module may be configured to operate on the user computer terminal. The compliance module may be operable to receive the information relating to the proposed order. The compliance module can also determine whether a compliance check can be performed locally for the proposed order, or whether the compliance check must be performed by remote compliance services. If said compliance check can be performed locally, the compliance module can be configured to determine whether the proposed trade order complies with the plurality of trading rules using a set of computer-executable trading rules. If the compliance check cannot be performed locally, the compliance module can be configured to generate a message to the remote compliance services server to request the compliance check.

The data storage facilities may be coupled with the user computer terminal and the compliance services server. Additionally, the data storage facilities can store information relating to the types and amounts of assets that can be trading according to the plurality of trading rules associated with the account.

According to an embodiment of the present invention, a method of determining whether a proposed order complies with a plurality of trading rules is provided. The method may be used in a computer system configured to manage asset trading for accounts over an electronic network. According to the method, a set of locally executable trade rules is received from a compliance services server over an electronic network at a user computer terminal. Information relating to a proposed order is received from a user interface configured to run on the user computer terminal. A local determination is made about whether the proposed order complies with the locally executable trade rules. Also, according to the method, information relating to a proposed order can be sent to the compliance services server over the electronic network if it is determined that the proposed order does not comply with the locally executable trade rules.

According to some embodiments of the present invention, the compliance module can be configured to detect which proposed trade orders pass the compliance check and send information about the proposed trade orders that fail the compliance check to the compliance services server for additional processing that may include further auditing.

According to some embodiments of the present invention, complicated restriction rules may be condensed into a compact list of restricted assets to minimize the footprint of the computer user terminal and to improve performance. This may be accomplished by using a generalized data query, according to embodiments of the present invention.

According to other embodiments of the present invention, the compliance module of the user computer terminal can execute rules that use transaction property values.

According to some embodiments of the present invention, the data for determining compliance locally may be cached at the user computer terminal. Updates to the cached data can be published to the user computer terminal as changes occur to the trading rules and any reference data.

According to some embodiments of the present invention, the use of the local compliance module is optimized when compliance checking occurs at the process stage, since calculated rules do not need to be tested. Some embodiments of the present invention provide the ability to configure whether rules are tested immediately or in the background. This ability to configure the rule testing can allow the local compliance module to be used in more cases. Some embodiments allow the ability to configure the rule testing differently for restriction rules versus calculated rules. Also, according to some embodiments of the present invention, rule testing may be configured differently by account. According to other embodiments of the present invention, different rules can be configured to use different types of testing.

According to some embodiments of the present invention, the compliance module may be configured to cache a "min/max shares" value for various assets so that the calculated rules can be tested locally on the client system. Also, the min/max shares value may be maintained on a per asset basis, account, transaction type basis, or process stage basis according to some embodiments of the present invention. According to some embodiments of the present invention, a network of orders can be managed by relevance in order to determine which min/max share values need to be updated. The updates to the min/max share values can then be published, according to some embodiments of the present invention.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

The present invention relates to a compliance system that allows users to verify that trading rules and regulations are being followed throughout the intraday trading activity. In particular, the systems and methods of the present invention allow a user to verify compliance with trading rules locally at a trading terminal thereby substantially reducing the system cost and latency. A trading rule combines attributes of securities, attributes of a trade, and optionally compliance calculations and limits relative to the traded accounts and benchmark positions. The amount and constantly changing nature of security master and position data makes it impractical to store the data within the trading application front-end (e.g., an order management system (OMS)). However, invoking back-end compliance services to evaluate rules suffers high latency and increased synchronization costs, which decreases performance.

Figure 1:
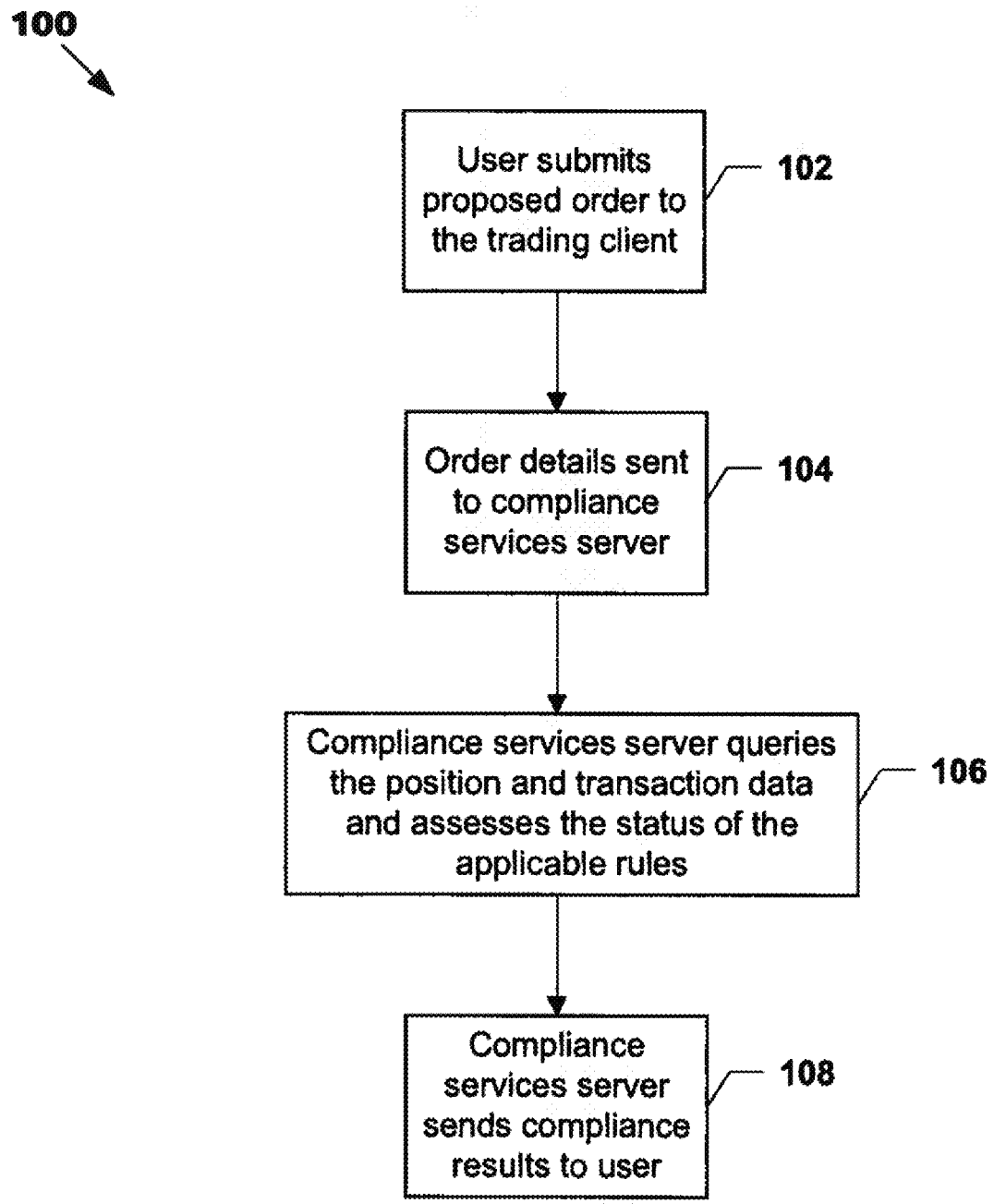
FIG. 1 is a flow chart of a method of determining the compliance of a proposed order with trading rules.

FIG. 1 describes a process 100 by which the compliance of a proposed trade can be evaluated using back-end compliance services. When a trading client user (e.g., a trader or a portfolio manager) desires to make a trade, the user submits a proposed order at step 102. According to some embodiments of the present invention, the user submits the order to an order module operating on a user computer terminal, which is part of a trading client. The order details are sent to a compliance services server over an electronic communications network (such as the internet, a local area network, or a wide area network) for determining whether the order complies with the pertinent trading rules at step 104. The compliance services server then queries the position and transaction data relevant to the account at issue and assess the status of the application rules at step 106. The compliance services server can then make a determination about whether the trade fails to comply with any of the trading rules relevant for the account at issue. The results of the determination can then be sent back to the user over the electronic communications network at step 108.

Figure 2:
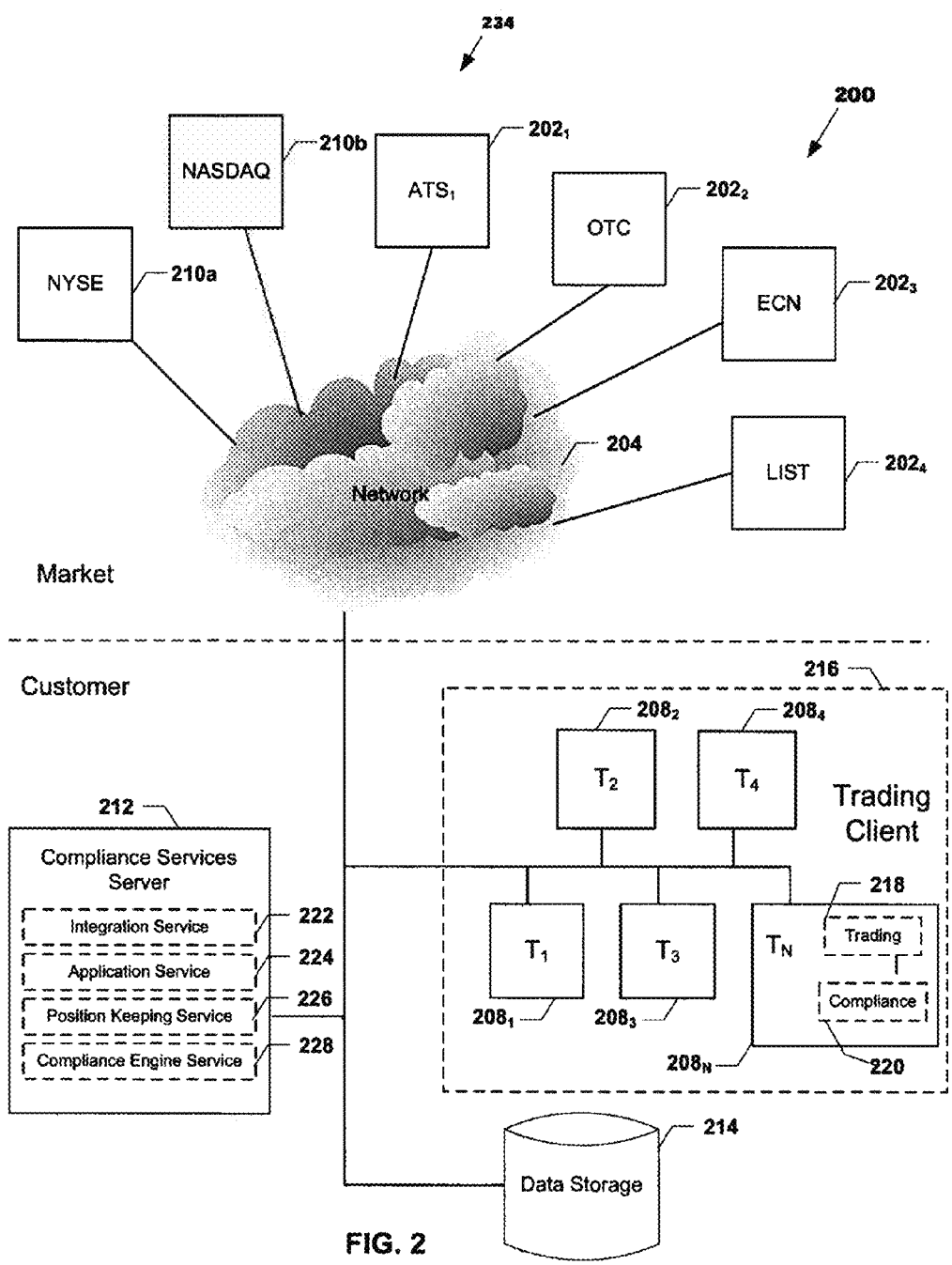
FIG. 2 is a block diagram that depicts an asset trading system according to embodiments of the present invention.

FIG. 2 is a block diagram that depicts a logical arrangement of a trading system 200 that includes high performance compliance facilities according to one embodiment of the invention. In general, as shown in FIG. 2, the system can be viewed as being divided into a market side and a customer side. On the market side are the electronic trading venues 234 that are connected to electronic network 204. The electronic trading venues 234 may include a plurality of stock exchanges 210a, 210b, an alternative trading system or systems (ATS) $202_1$ such as ITG's POSIT®, over the counter (OTC) venues $202_2$, ECNs $202_3$, or other electronic trading venues $202_4$ connected to an electronic network 204.

The customer side includes trading facilities at a trading firm 216, which can include a number of user computer terminals $208_1$-$208_N$ for use by portfolio managers and traders. Each terminal is configured to execute a trading client, such as an order management system (OMS) or execution management system (EMS). The trading facilities 216 may further include a compliance services server or servers 212 and data storing facilities (e.g., a database) 214 for storing trading data on a computer-readable medium.

As shown, each terminal 208 may include a trading module 218 and a compliance module 220, which may be configured to communicate with each other via messaging or other communication protocols. According to some embodiments of the present invention, some or all of the user computer terminals $208_1$-$208_N$ are virtual terminals that access the trading client via some remote accessing facility such as telnet or Citrix.

According to some embodiments of the present invention, the compliance services server 212 is configured to perform computations to determination whether a particular proposed trade order will violate any of an account's associated trade rules. As shown in FIG. 2, the compliance services server 212 may include several elements that perform different functions according to various embodiments of the invention.

Integration service 222 is configured to execute at the start of the day executables and web services that load reference and transaction data from data storage 214 or from some third party data provider accessible over an electronic communications network. This data can include information relating to an account's cash on hand, tax lots, carry-over orders, and stock splits. Integration service 222 can also write reference data to data storage 214 and use the position keeping service 226 to write transaction and tax lot data. Additionally, integration service 222 can be configured to communicate with the compliance engine service 228 in order to instruct it to check compliance of specific accounts and account groups.

Application service 224 is configured to communicate with the trading client 216 and is responsible for, amongst other things, presenting the compliance results to the end user. In particular, the application service 224 handles user interface requests and updates the database 214 resulting from user interface activity. Position keeping service 226 manages all transactions and tax lots. This service writes tax lots to the database based on the transactions that it receives from the integration service.

The compliance engine service 228 is configured to monitor position and transaction data and to maintain the current compliance status of the various accounts. The compliance engine service 228 is configured to query the position and transaction data for an account and assess the status of the applicable rules by reading reference data from the data storage 214. The results of the compliance status can be written to the data storage 214, and, optionally, transmitted to the trading client via application service 224. According to other embodiments of the present invention, the compliance engine service 228 may use cached data rather than querying the data storage 214.

While compliance services server 212 is depicted as being a single computer logical block, one of ordinary skill in the art would understand that compliance services server 212 may be divided amongst several computer servers and that the various components of the compliance services server 212 may each exist on one or more computer servers. That is, each of the components (222, 224, 226, and 228) may themselves exist on multiple computers in different physical locations according to various embodiments of the present invention. According to some embodiments of the present invention, the compliance services server 212 may be located at some remote hosting facility and provided as a service to customers.

According to some embodiments of the present invention, each of the components of the compliances services server 212 communicates with other components via a messaging scheme such as a message bus (e.g. TIBCO, Sonic), Microsoft message queuing (MSMQ), XML web services, file copy over network share, or file transfer protocol (FTP).

Each terminal 208 may be configured to include a trading module 218, a compliance module 220, or both. Initially, a user may enter trade information or data into the terminal 208 using the trading module 218. Prior to executing the trade, the trading module will send the relevant information concerning the proposed trade to the compliance module 220, which will determine whether the proposed trade complies with the trading rules. In order to determine whether the proposed trade complies with the trading rules, the compliance module 220 may be configured to determine whether compliance with trading rules can be computed locally or at the compliance services server 212. If the compliance module 220 determines that local execution is possible, the compliance module 220 can be configured to send a message to the trading module 220 after the compliance module 220 has completed its compliance determination. Compliance checks are described in further detail below with respect to FIGS. 3-6.

If the compliance module 220 determines that it is possible to have the compliance services server 212 determine compliance, then the compliance module 220 is configured to generate an appropriate message to send to the compliance services server 212.

According to some embodiments of the invention, the communication messages between the modules executing on the terminals and the servers may be made in XML format, however one of ordinary skill in the art would recognize that any messaging format suitable for sending information electronically would suffice.

According to embodiments of the present invention, the compliance services server 212 may be configured to receive a message (e.g., an XML message) from trade client containing information relating to a proposed trade. According to some embodiments, the message may contain information relating to the proposed asset, the account at issue, and the kinds of rules (e.g., restriction or calculated) that should be checked. The compliance services server 212 may also be configured to send a response message to the trading client 216 containing information relating to the compliance of the proposed trade. One of ordinary skill in the art would understand that both the message and the response message can be of any suitable computer-readable format capable of being electronically sent from one computer to another computer.

Figure 3:
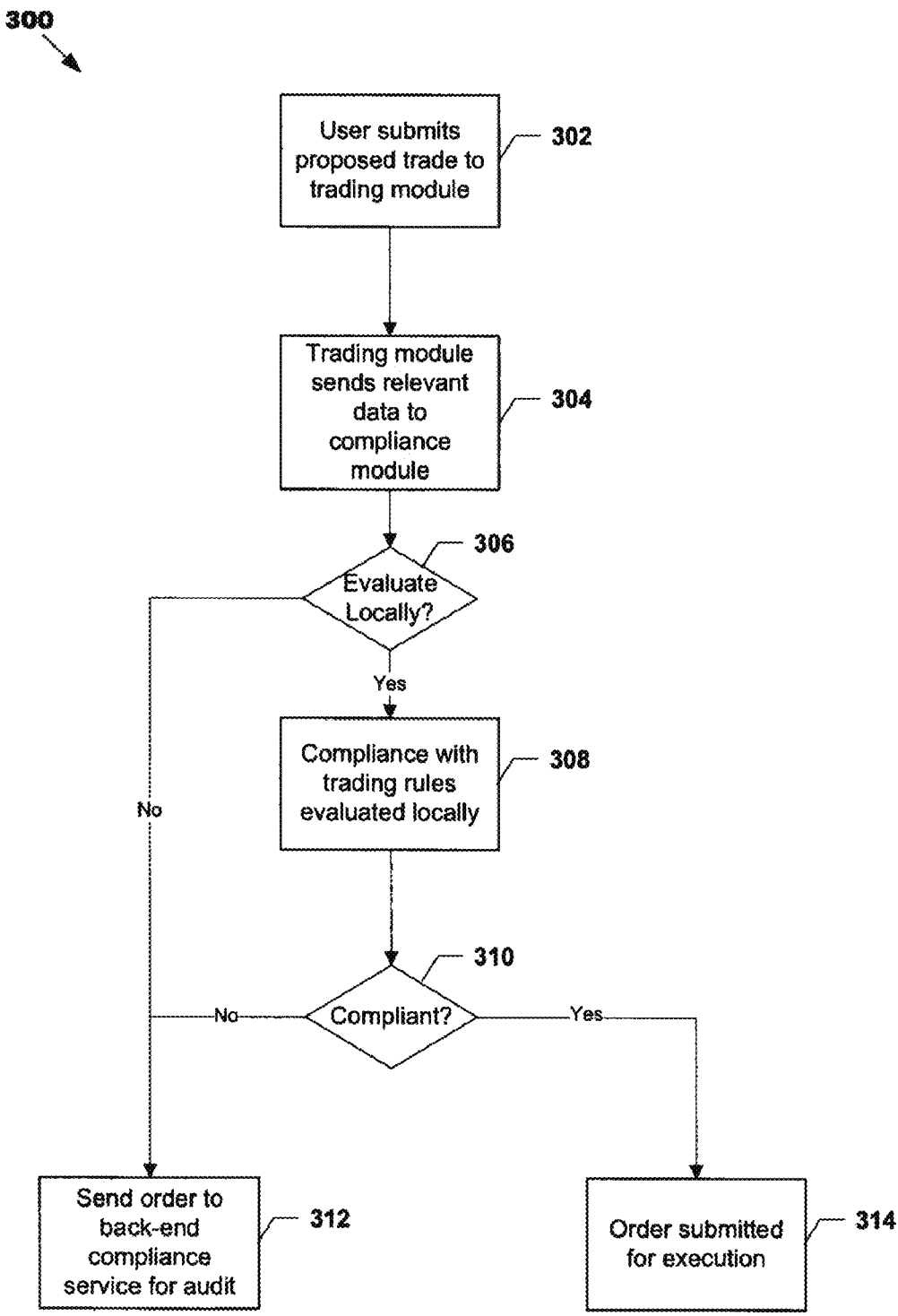
FIG. 3 is a flow chart of a method for locally determining compliance with trade rules according to embodiments of the present invention.

FIG. 3 is a flow chart of a process 300 by which the latency associated with compliance checking may be reduced by checking compliance locally when possible according to an embodiment of the present invention. Much as in process 100, the user in process 300 submits a proposed trade at step 302. At this point, however, instead of sending the order trade details to a compliance services server 212, as contemplated in process 100, in process 300, the trading module sends the relevant data to a compliance module 220 at step 304. The compliance module 220 then determines whether it is appropriate to evaluate compliance locally or to send the trade information to the compliance services server 212 for a compliance evaluation at step 306. If the compliance module determines that a local evaluation is inappropriate, then it will send the order to compliance services server 212 at step 312. If local evaluation is appropriate, then compliance is evaluated locally at step 308. For performance reasons, it is preferable for the local compliance module 220 to perform the compliance evaluation. In particular, local checking of compliance is preferable because most proposed trades will pass the compliance check and can then be quickly sent for execution. However, the skilled person will recognize that, in some circumstances, it is appropriate to utilize the services of the compliance services server 212. For example, when the local compliance module 220 lacks all of the necessary information, the compliance services service 212 can be used. Additionally, use of the compliance services server 212 is appropriate when a proposed trade is found to violate one or more compliance rules, because this may require use of the compliance services server 212 for evaluation and auditing purposes according to some embodiments of the invention.

By evaluating compliance locally, the time associated with sending data over the network as well as the back-end processing by the compliance services server 212 can be eliminated. At step 308 it is determined whether the proposed trade is compliant. If it is, then no further work is necessary and the trade can be submitted for execution at step 314 in the trading venues 234. If the proposed trade is not compliant, then the proposed trade is submitted to the compliance service server 212 for audit at step 312. According to some embodiments of the present invention step 308 is substantially similar to process 100. Since the vast majority of proposed trades end up being found compliant, the process 300 normally results in less system costs and decreased latency.

Figure 4:
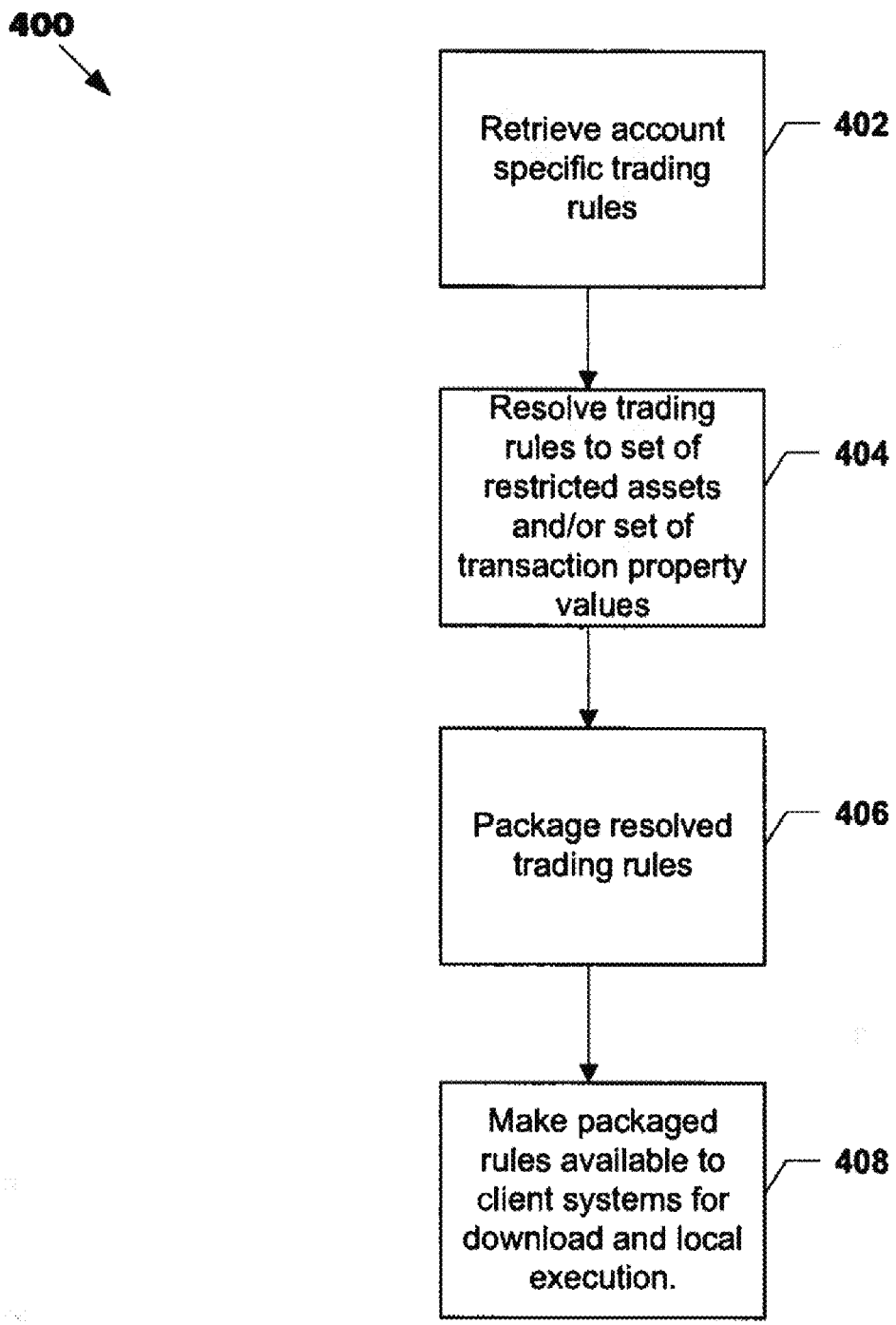
FIG. 4 is a flow chart of a method of generating locally executable trading rules according to an embodiment of the present invention.

In order to perform the compliance check (step 308) locally, the client system must be given certain information. At the time of the compliance check, the client system will know, for instance, asset and broker unique ID values, but will not know reference data properties mentioned in the rule. Examples of such reference data properties may include the country of risk associated with the security, the effective duration of the security, or a rating assigned to the security by a ratings agency such as S&P or Moody's. For instance, if a trading rule restricted an account from trading the securities of companies with citizenship in certain countries, the client system would not know which countries are associated with which assets. Downloading all of this information to a client, however, would be prohibitively expensive in terms of resource usage and is also largely unnecessary. Instead, a particular account's trading rules can be resolved into a set of restricted assets and/or a set of transaction property values in advance of the trade by, for instance, the compliance services server 212. This will minimize the client system's footprint and improve performance FIG. 4 is a flow chart of a process 400 by which the compliance services server 212 makes compliance-checking data available to a client according to an embodiment of the present invention. First, the relevant trading rules for a particular account are retrieved at step 402. Once the rules are retrieved, the restriction rules are converted into a query that can be executed against the reference data known to the compliance system.

This query can be in any language, such as structured query language (SQL), .NET, Language-Integrated Query (LINQ), a custom query language defined by a structured document (XML), or other non-structured filter conditions implemented in software. These queries act upon the system's reference data, including attributes of each security as well as portfolios of other benchmarks and market indices. For example, a restriction rule might prohibit holding securities in the technology sector whose issuers have a market capitalization lower than the smallest market capitalization in the S&P 500 benchmark index. This rule would filter securities both on their sector membership (technology only) and on their market capitalization (lower than the lowest in the index). The compliance services server executes this query to resolve the rule into a set of securities that cannot be traded.

According to some embodiments of the present invention, the process of converting a rule to a query can be performed when the rule is originally saved, avoiding the cost of conversion each day. Some restriction rules rely not only on reference data but also on the properties of the order itself. For example, a trading rule might restriction selling short in the securities issued by the company that the trader works for. For these rules, the set of assets that cannot be traded is augmented by a set of transaction property values.

Last, calculated rules are resolved on a per-order basis according to how much can be traded, as described in a subsequent section. The set of restricted assets, transaction property values, and tradable share quantities per order can then be packaged into a compact usable form such as a hashtable or binary (bit) array of security identifiers at step 406. The packaged sets are then made available to the client systems for download and local execution at step 408. According to some embodiments of the present invention, the client system downloads the packaged rules each time the client user logs on and periodically thereafter.

According to some embodiments of the invention, process 400 can be preformed both at the start of every day or when rules or reference data are modified. Additionally, the compliance services server 212 could be configured to detect any relevant asset changes, re-compute restricted assets on demand, and publish the changes to the client system.

Compliance with the trading rules may be checked at several stages of the trading process. For instance, rule compliance can be checked when an order is submitted, placed, or confirmed. Each stage of the trading process considers a different set of orders and therefore has a distinct set of associated positions. Checking compliance at each stage in the trading process can catch trading imbalances that occur as a result of the inability to fully execute orders via the market. For example, a portfolio manager may wish to buy one security and sell another security in the same sector, in order to offset their effects and remain compliant with respect to a trading rule. Suppose the buy order is fully executed in the market but the sell order cannot be fully executed due to insufficient liquidity. In this case, checking compliance at the submitted stage would not reveal any trading rule violations, however, checking compliance at the confirmed stage would reveal a violation due to the imbalance. This example demonstrates how it is useful to check compliance at every stage of the trading process to minimize trading rule violations.

Another important point is that the set of positions at certain process stages is indistinguishable from the preceding process stages. For example, when placing a trade with a broker, the positions in the security are left unchanged viz. a viz. the submitted process stage. Therefore a compliance check at the placed stage does not need to re-evaluate calculated trading rules. This knowledge of which process stage is associated with the compliance check can be used as an optimization to determine whether the compliance check can be evaluated at the local terminal.

Sometimes the user may find it advantageous to only check compliance with a subset of the rules for certain transactions. Accordingly, according to one embodiment of the present invention, the system can be configured to allow several different kinds of compliance checking. Several exemplary kinds of compliance checking are:

Test immediately: Under this scheme, all of the trade rules for a particular account are checked prior to every trade. This provides the maximum compliance checking.

Test in the background: Under this scheme, compliance rule violations do not block the user from performing the trade. The trade details are sent to the compliance services server for monitoring by a compliance officer.

Test batch only: Under this scheme, the client computer only checks an account's compliance with the rules at the start of the day.

According to other embodiments of the present invention, restriction rules and calculated rules can be handled differently. That is, according to one embodiment of the present invention, the system is configurable to allow the user to dictate whether restriction rules or calculated rules are checked for compliance immediately or in the background. Additionally, according to other embodiments of the present invention, the user can specify whether a particular account or group of accounts will be checked immediately, in the background, or batch only. According to another embodiment, the user can specify whether an individual rule (as opposed to the broad categories of rules described above) should be checked immediately, in the background, or as a batch.

For calculated trade rules, it may sometimes be prohibitive to pre-calculate and store the relevant compliance data for all possible trades that may be made in a particular account. Nevertheless, improvements in efficiency of compliance checking may be effected by locally caching compliance data each time a proposed trade is sent to the compliance services server 212 for compliance checking. According to some embodiments of the present invention, each time an intraday compliance check occurs for a particular stock for a particular account, the compliance engine service 228 can compute the minimum and maximum shares the calculated trade rules for that account allow to be traded. This "min/max shares" information can then be sent back to the client system, where it can be cached in case the same user executes the same compliance check. The cached min/max shares information can then be used to execute compliance checks locally on the client system. According to some embodiments, the min/max shares information can include a warning limit. A warning limit is a limit at which the system displays a warning to the end user informing the user that, while the contemplated trade will not itself violate the trade rules, the open position of the traded asset will be or is within a certain pre-defined range of the minimum or maximum number of shares required by the trade rules. According to some embodiments, the min/max shares information can be dependent on the transaction type (e.g., Buy or Sell) or stage of the trading process (e.g. Submit or Confirmed).

Figure 5:
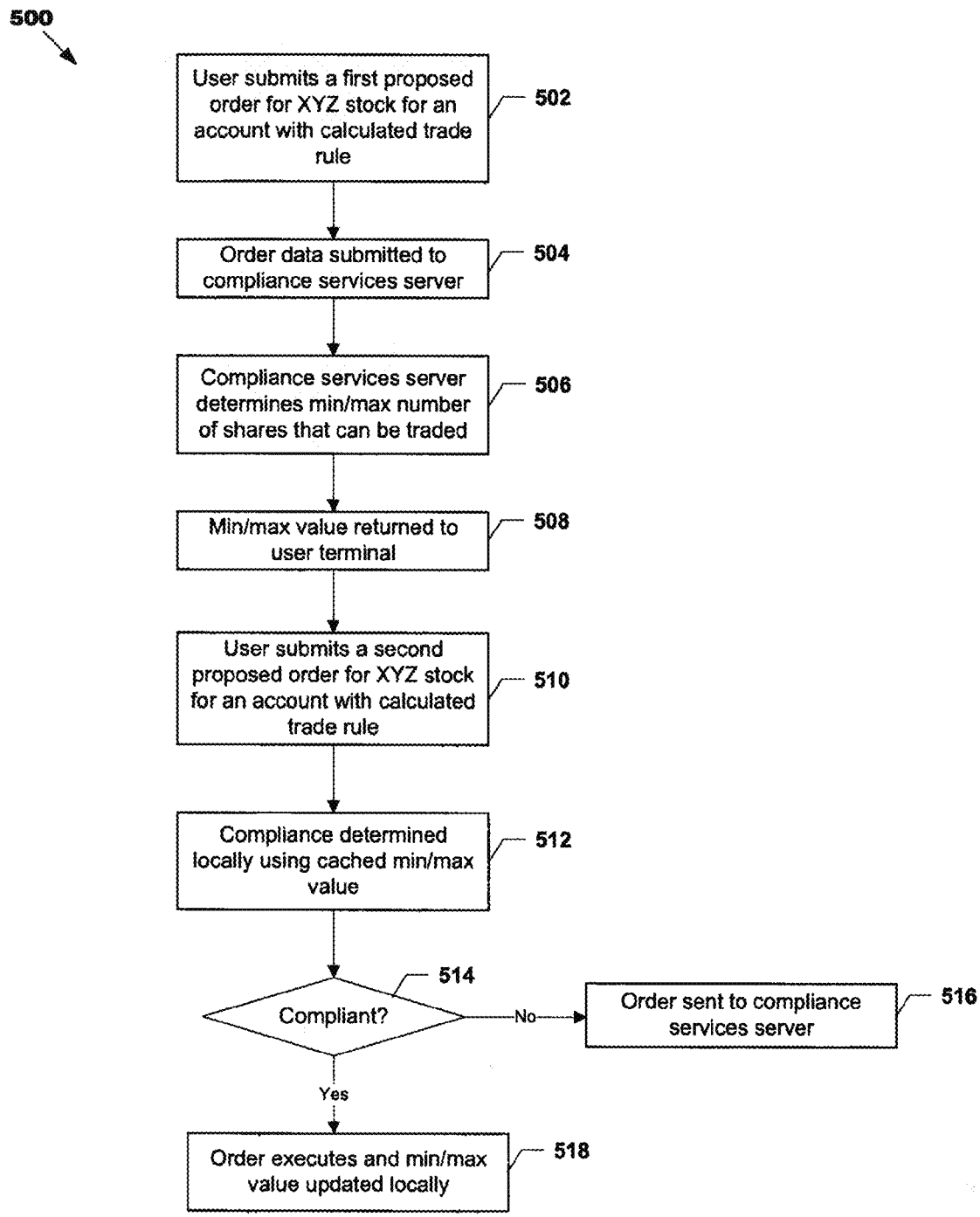
FIG. 5 is a flow chart of a method of locally determining whether a proposed order complies with a calculated trade rule according to embodiments of the present invention.

FIG. 5 is a flow chart depicting how the min/max values can be cached locally and used according to an embodiment of the present invention. When the user submits a first proposed order for and asset (e.g., XYZ stock) for a particular account with a calculated trade rule or rules at step 502, that order is submitted to the compliance services server 212 at step 504. The compliance services server 212 can then determine, amongst other things, the minimum/maximum number of shares of the asset that can be traded in the account given the calculated trade rule (or rules) at step 506. The compliance services server 212 can then return the minimum/maximum value to the user terminal at step 508, where the value is then cached locally. When the user performs a second trading action related to the same account and asset (i.e., XYZ stock in our example) at step 510, the compliance with the calculated trade rule can then be calculated at step 512 using the locally cached min/max value. The second trading action can take a number of different forms, including but not limited to: creating a second proposed order for the same account and asset; rechecking compliance on the original proposed order; editing the target quantity of the original proposed order; or editing other details of the original proposed order. If the proposed trade is compliant (step 514), then the order can execute and the local terminal can update the min/max value to reflect the number of shares traded upon execution of the proposed order. If the proposed order is not compliant, then the order is sent to the compliances services server 212 at step 516. If the local evaluation determines that the proposed order is compliant, then the order can be executed at step 518.

In order to update the min/max shares associated with each order throughout the day, the compliance engine service tracks how orders impact the calculated rule assignments in the compliance system. An order is defined as "relevant to" a calculated rule assignment if the creation of the order impacts the calculated value produced by the rule assignment. For example, if an account were assigned a calculated rule that set a maximum limit of holdings in technology stocks, an order to buy a technology stock would be relevant to the rule, whereas an order to buy a financial stock would not be relevant. According to some embodiments of the present invention, the determination of relevance can be designed to use the same query structure as is used by restriction rules, as described previously. Using this definition of "relevance", the compliance engine service constructs a network of orders, where two orders are connected if and only if they are relevant to the same calculated rule assignment. Upon receiving a new order, the compliance engine service adds the order to the network and updates the min/max shares for only those orders connected to it. Upon receiving a modification to the target quantity of an existing order, the compliance engine service updates the min/max shares for only those orders connected to the modified order. Whenever the min/max shares is updated for any order, the compliance engine service publishes the change to all client local compliance modules so that the new min/max shares can be used for local compliance evaluation.

Figure 6:
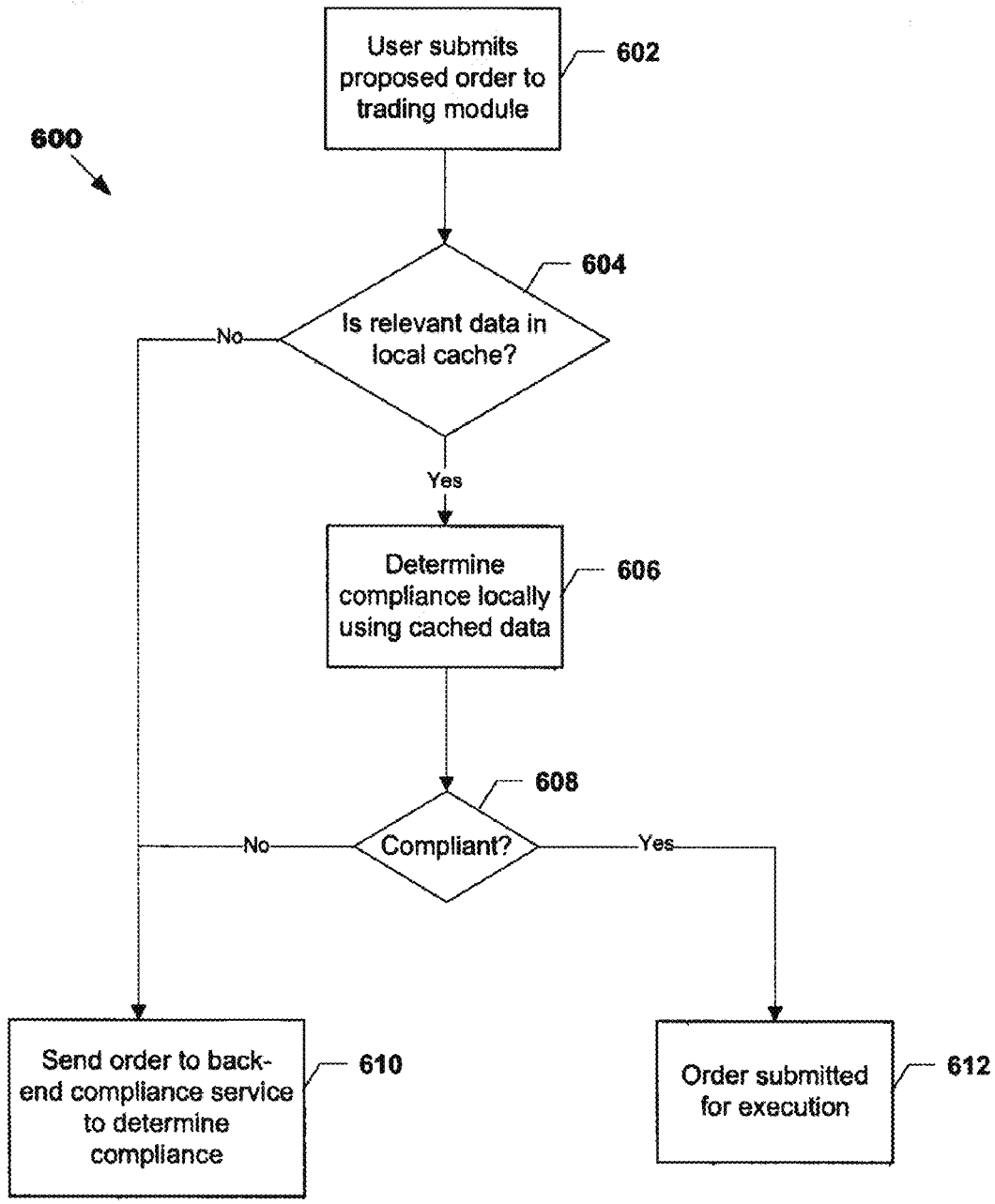
FIG. 6 is a flow chart of a method of determining whether a proposed order complies with a calculated trade rule according to embodiments of the present invention.

According to some embodiments of the present invention the determination to use the cached local min/max values is made according to process 600 depicted in FIG. 6. When the user submits a proposed order for an account with a calculated trading rule at step 602, it is determined whether the relevant data for determining compliance with the calculated trading rule is available in the local cache at step 604. If the data is not available, then the trade is sent to the back end compliance service to determine if the proposed trade violates the trading rules associated for the account at step 610. According to some embodiments of the present invention, the process followed at step 610 is similar to process 100 depicted in FIG. 1.

If the relevant data is found to be in the local cache at step 604, then it is next determined whether the proposed trade complies with the calculated rule at step 608 using the cached data at step 606. If the proposed trade is found to violate a calculated trade rule, then the proposed order is sent to the compliance service at step 610. If the proposed order complies with the calculated trade rules, then the order can be submitted for execution at step 612.

Thus, a number of preferred embodiments have been fully described above with reference to the drawings and figures. Other details of the embodiments of the invention should be readily apparent to one skilled in the art from the drawings. Although the invention has been described based upon these preferred embodiments, it would be apparent to those skilled in the art that certain modifications, variations, and alternative constructions would be apparent, while remaining within the spirit and scope of the invention.

We claim:

1. A compliance system for electronic trading of tradable assets, said system comprising:
a remote compliance services server configured:
(a) to perform, in response to a compliance check request from a trade desktop terminal, a compliance check of a proposed trade order wherein performing the compliance check comprises: determining whether the proposed trade order complies with trading rules of an account associated with the proposed trade order, and transmitting a response message to the trade desktop terminal indicating whether the proposed trade order complies with the trading rules, and
(b) to provide a package of compliance verification data to the trade desktop terminal for local compliance verification, wherein the providing comprises:
identifying securities that cannot be traded in accordance with the trading rules,
generating the package of compliance verification data such that the package includes a list of securities that cannot be traded in accordance with the trading rules, and
transmitting the package of compliance verification data to the trade desktop terminal via an electronic data network;
a local compliance checking module configured to operate on the trade desktop terminal, wherein the compliance checking module is configured to:
receive the package of compliance verification data from the remote compliance services server over the electronic data network,
store the package of compliance verification data locally,
determine whether a compliance check can be performed for the proposed order based on the locally stored package of compliance verification data, and
if the compliance check can be performed locally, to perform the compliance check locally based on the locally stored package of compliance verification data, and if not, to request a compliance check for the proposed trade order from the remote compliance services server.

2. The system as recited in claim 1, wherein performing the compliance check locally comprises determining that the proposed trade order complies with said plurality of trading rules.

3. The system as recited in claim 1, wherein said compliance module is further configured to request a compliance check from the remote compliance services server in response to performing the compliance check locally and determining that said proposed trade order is not compliant with said set of local computer-executable trading rules.

4. The system recited in claim 1, wherein the trade desktop terminal is configured to execute said proposed trade order in response to the compliance module determining that said proposed order complies with said local computer-executable trading rules.

5. The system as recited in claim 4, wherein the trade desktop terminal is configured to update the locally stored package of compliance verification data in response to the results of the execution of the proposed trade order.

6. The system as recited claim 1, wherein the package of compliance verification data is stored in a relational database coupled to the trading desktop terminal via a local area network.

7. The system as recited in claim 1, wherein said trade desktop terminal is further configured to perform the local compliance check immediately or in a background process based on one or more configuration parameters.

8. The system as recited in claim 7, wherein performing the local compliance check immediately or in the background is further based on an account or a group of accounts associated with the proposed order.

9. The system as recited by claim 1, wherein the package of compliance verification data further comprises transaction property values indicating one or more restriction rules or property values indicating tradeable share quantities per order.

10. A computer-implemented method for performing compliance checks for proposed trade orders, said method comprising the following steps:
receiving, at a trade desktop terminal, a package of compliance verification data from a compliance services server over an electronic network, wherein the package of compliance data includes a list of securities that cannot be traded in accordance with one or more trade rules;
at said terminal, receiving information relating to a proposed trade order;
at said terminal, determining whether a compliance check can be performed for said proposed trade order locally based on the package of compliance data received from the compliance services server;
at said terminal, in response to determining that the compliance check can be performed locally, determining whether said proposed order complies with said trade rules based on the package of compliance verification data rather than by requesting a compliance check from the compliance services server.

11. The method as recited in claim 10, further comprising a step of executing said proposed trade order in response to determining that said proposed order complies with the trade rules.

12. The method as recited in claim 10, further comprising, at said terminal, receiving a second proposed trade order and in response to determining that a compliance check of the second proposed trade order cannot be performed locally based on the compliance verification data, requesting a compliance check of the second proposed trade order from said compliance services server.

13. The method as recited in claim 12, further comprising a step of receiving min/max values from said compliance services server in response to requesting the compliance check of the second proposed trade order from said compliance services server.

14. The method as recited in claim 10, further comprising a step of updating the package of compliance verification data to reflect the results of the executed trade order.

15. The method as recited in claim 10, further comprising a step of receiving an updated package of compliance verification data from said compliance services server over an electronic network.

16. The method as recited in claim 10 further comprising a step of determining whether the compliance check of said proposed order is performed immediately, or in the background.

17. The method as recited in claim 16, further comprising a step of determining whether the compliance check of said proposed order is performed immediately, or in the background differently for restriction trade rules than for calculated trade rules.

18. The method as recited in claim 10, wherein the trade rules correspond to calculated trade rules each having an associated min/max value.

19. The method as recited in claim 18, further comprising a step of executing said proposed trade order in response to determining that said proposed order complies with said trade rules and locally updating the min/max values associated with calculated ones of the trade rules.

20. A system for performing compliance checks on proposed electronic trade orders, comprising:
  means for receiving a package of compliance verification data from a compliance services server over an electronic network, wherein the package of compliance data includes a list of securities that cannot be traded in accordance with one or more trade rules;
  means for receiving information relating to a proposed trade order;
  means for determining whether a compliance check can be performed for said proposed trade order locally based on the package of compliance data received from the compliance services server;
  means for responding to a determination that the compliance check can be performed locally by determining whether said proposed order complies with said trade rules based on the package of compliance verification data rather than by requesting a compliance check from the compliance services server.

21. The system as recited in claim 20, further comprising a means of executing said proposed trade order in response to determining that said proposed order complies with the trade rules.

22. The system as recited in claim 20, further comprising a means for receiving a second proposed trade order and in response to determining that a compliance check of the second proposed trade order cannot be performed locally based on the compliance verification data, requesting a compliance check of the second proposed trade order from said compliance services server.

23. The system as recited in claim 22, further comprising means for receiving min/max values from said compliance services server in response to requesting the compliance check of the second proposed trade order from said compliance services server.

24. The system as recited in claim 20, further comprising a means for updating the package of compliance verification data to reflect the results of the executed trade order.

25. The system as recited in claim 20, further comprising a means for receiving an updated package of compliance verification data from said compliance services server over an electronic network.

26. The system as recited in claim 20, further comprising means for determining whether the compliance check of said proposed order is performed immediately, or in the background.

27. The system as recited in claim 26, further comprising means for determining whether the compliance check of said proposed order should be performed immediately, or in the background differently for restriction rules and calculated rules.

28. The system as recited in claim 20, wherein the trade rules correspond to calculated trade rules each having an associated min/max value.

29. The system as recited in claim 28, further comprising means for executing said proposed trade order in response to determining that said proposed order complies with said trade rules and locally updating the min/max values associated with calculated ones of the trade rules.

30. A non-transitory computer-readable medium storing computer executable instructions performing compliance checks for proposed trade orders by performing operations comprising:
  receiving a package of compliance verification data from a compliance services server over an electronic network, wherein the package of compliance data includes a list of securities that cannot be traded in accordance with one or more trade rules;
  receiving information relating to a proposed trade order;
  determining whether a compliance check can be performed for said proposed trade order locally based on the package of compliance data received from the compliance services server;
  responding to a determination that the compliance check can be performed locally by determining whether said proposed order complies with said trade rules based on the package of compliance verification data rather than by requesting a compliance check from the compliance services server.

31. The non-transitory computer-readable medium of claim 30, wherein the operations further comprise: executing said proposed trade order in response to determining that said proposed order complies with the trade rules.

32. The non-transitory computer-readable medium of claim 30, wherein the operations further comprise: receiving a second proposed trade order and in response to determining that a compliance check of the second proposed trade order cannot be performed locally based on the compliance verification data, requesting a compliance check of the second proposed trade order from said compliance services server.

33. The non-transitory computer-readable medium of claim 32, wherein the operations further comprise: receiving min/max values from said compliance services server in response to requesting the compliance check of the second proposed trade order from said compliance services server.

34. The non-transitory computer-readable medium of claim 30, wherein the operations further comprise: updating the package of compliance verification data to reflect the results of the executed trade order.

35. The non-transitory computer-readable medium of claim 30, wherein the operations further comprise: receiving an updated package of compliance verification data from said compliance services server over an electronic network.

36. The non-transitory computer-readable medium of claim 30, wherein the operations further comprise: determining whether the compliance check of said proposed order is performed immediately, or in the background.

37. The non-transitory computer-readable medium of claim 36, wherein the operations further comprise: determining whether the compliance check of said proposed order is performed immediately, or in the background differently for restriction rules and calculated rules.

38. The non-transitory computer-readable medium of claim 30, wherein the trade rules correspond to calculated trade rules each having an associated min/max value.

39. The non-transitory computer-readable medium of claim 38, wherein the operations further comprise: executing said proposed trade order in response to determining that said proposed order complies with said trade rules and locally updating the min/max values associated with calculated ones of the trade rules.

* * * * *